(12) United States Patent
Yang et al.

(10) Patent No.: US 11,679,691 B2
(45) Date of Patent: Jun. 20, 2023

(54) BATTERY HEATING DEVICE, BATTERY HEAT ADJUSTMENT METHOD, STORAGE MEDIUM, AND ELECTRONIC DEVICE

(71) Applicant: Guangzhou Automobile Group Co., Ltd., Guangdong (CN)

(72) Inventors: Qin Yang, Sunnyvale, CA (US); Meng Yao, Sunnyvale, CA (US); Bozhi Yang, Sunnyvale, CA (US); Xiaohui Li, Sunnyvale, CA (US); Yifeng Lin, Guangdong (CN); Zihui Ma, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 84 days.

(21) Appl. No.: 16/937,627

(22) Filed: Jul. 24, 2020

(65) Prior Publication Data

US 2022/0024350 A1 Jan. 27, 2022

(51) Int. Cl.
| | |
|---|---|
| *B60L 58/27* | (2019.01) |
| *B60K 11/02* | (2006.01) |
| *H01M 10/615* | (2014.01) |
| *H01M 10/625* | (2014.01) |
| *H01M 10/48* | (2006.01) |
| *H01M 10/663* | (2014.01) |
| *H01M 10/63* | (2014.01) |
| *H01M 10/6568* | (2014.01) |

(52) U.S. Cl.
CPC .............. *B60L 58/27* (2019.02); *B60K 11/02* (2013.01); *H01M 10/486* (2013.01); *H01M 10/615* (2015.04); *H01M 10/625* (2015.04); *H01M 10/63* (2015.04); *H01M 10/6568* (2015.04); *H01M 10/663* (2015.04); *H01M 2220/20* (2013.01)

(58) Field of Classification Search
None
See application file for complete search history.

(56) References Cited

U.S. PATENT DOCUMENTS

2016/0248129 A1* 8/2016 Dunham ........... H01M 10/6567

FOREIGN PATENT DOCUMENTS

CN 108539327 A 9/2018

* cited by examiner

*Primary Examiner* — Karie O'Neill Apicella
(74) *Attorney, Agent, or Firm* — ScienBiziP, P.C.

(57) ABSTRACT

A battery heating device of an electric vehicle, a battery heat adjustment method, a storage medium, and an electronic device are provided. The device includes a battery heating circuit, an engine cooling circuit and a three-way valve. The three-way valve connects the battery heating circuit and the engine cooling circuit to mix a first liquid in the engine cooling circuit and a second liquid in the battery heating circuit, and transmits a mixed liquid to the battery heating circuit to heat a battery in the battery heating circuit. By means of the disclosure, the problems of large overall weight and packaging space of a system caused by the use of a heat exchanger and high manufacturing cost in a conventional art are solved, the overall weight and packaging space of the system are reduced, additional components are reduced, and the cost is reduced.

16 Claims, 8 Drawing Sheets

BATTERY HEATING DEVICE, BATTERY HEAT ADJUSTMENT METHOD, STORAGE MEDIUM, AND ELECTRONIC DEVICE

TECHNICAL FIELD

The disclosure relates to the field of communications, and more particularly, to a battery heating device of an electric vehicle, a battery heat adjustment method, a storage medium, and an electronic device.

BACKGROUND

With the focus on energy issues, energy conservation has become a hot topic. For example, with the popularity of electric vehicles, energy conservation in electric vehicles has become an important research topic.

Figure 1:
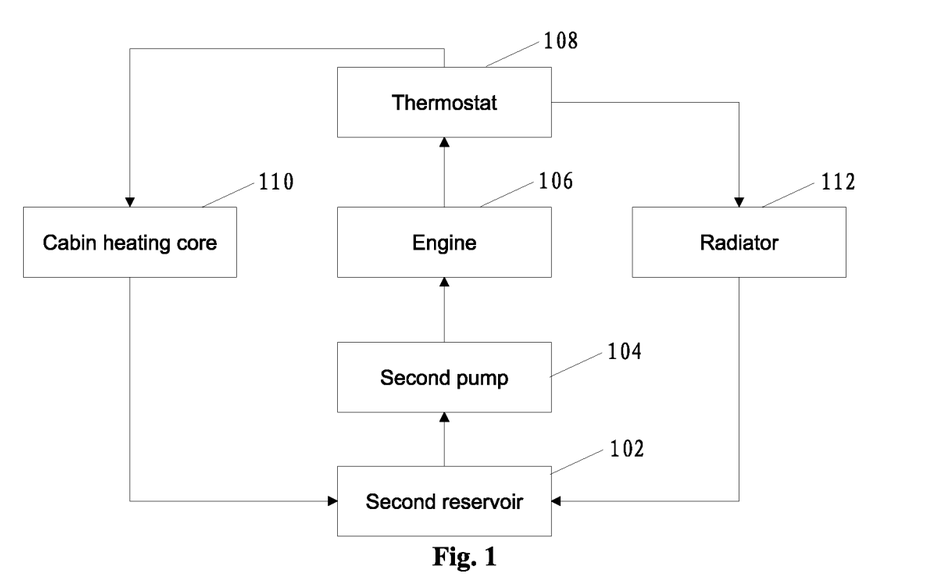
FIG. 1 is a schematic diagram of a common engine cooling circuit in the conventional art.
Figure 2:
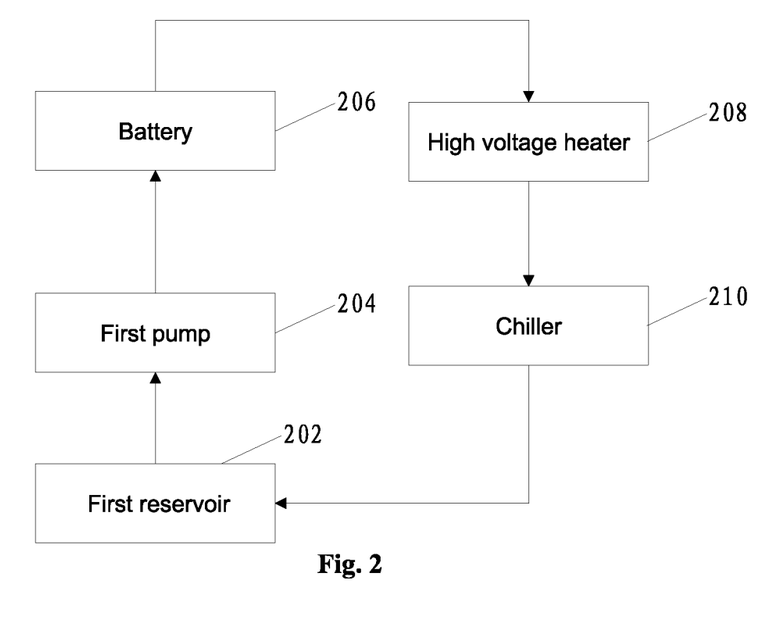
FIG. 2 is a schematic diagram of a common battery heating circuit in the conventional art.

In a conventional art, a schematic diagram of an engine cooling circuit of an electric vehicle is shown in FIG. 1. In the engine cooling circuit, a second pump 104 pumps a cooling liquid from a second reservoir 102 and pushes the cooling liquid through an engine water jacket. The cooling liquid cools an engine in the engine water jacket, absorbs heat, and raises the temperature. Engine heat is distributed through a thermostat 108. The heat passes through a cabin heating core 110 and/or a radiator 112 as required, thereby achieving the purpose of cooling the engine. In most Plug-in Hybrid Electric Vehicles (PHEV) or Hybrid Electric Vehicles (HEV), current battery heating methods involve a high voltage heater, which draws current from a battery and converts electric energy stored in the battery into heat to preheat the battery. A schematic diagram of a common battery heating circuit is shown in FIG. 2. When a battery needs to be heated, a high voltage heater 208 converts electric energy stored in the battery into a heat load and heats the battery. When the battery needs to be cooled, a chiller absorbs heat in the cooling liquid to a two-phase flow of an Air Conditioning (A/C) device. A battery heating/cooling circuit operates separately from an engine cooling circuit. When an engine needs to be cooled, a large amount of heat is released into surrounding air, and heat generated by the engine cannot be guided to the battery heating circuit, causing waste of energy.

In the conventional art, heat exchange between an engine circuit and a battery heating circuit may be achieved through a heat exchanger to increase the temperature of the battery circuit and reduce the temperature of the engine circuit. However, the volume and mass of the heat exchanger are large, the overall weight and packaging space of a system are increased, and additional components are added, resulting in higher manufacturing cost.

Aiming at the above problems in the conventional art, no effective solution has been proposed at present.

SUMMARY

Embodiments of the disclosure provide a battery heating device of an electric vehicle, a battery heat adjustment method, a storage medium, and an electronic device, so as to at least solve the problems of large overall weight and packaging space of a system caused by the use of a heat exchanger and high manufacturing cost in a conventional art.

According to one embodiment of the disclosure, a battery heating device of an electric vehicle is provided. The device may include a battery heating circuit, an engine cooling circuit and a three-way valve. The three-way valve may connect the battery heating circuit and the engine cooling circuit to mix a first liquid in the engine cooling circuit and a second liquid in the battery heating circuit, and transmits a mixed liquid to the battery heating circuit to heat a battery in the battery heating circuit.

According to another embodiment of the disclosure, a battery heat adjustment method is provided. The method may be applied to the device of the above embodiment and may include that: the first liquid and the second liquid are acquired; the first liquid and the second liquid are mixed to obtain a mixed liquid; and the obtained mixed liquid is transmitted to the battery heating circuit to adjust temperature of the battery.

According to yet another embodiment of the disclosure, a computer-readable storage medium is also provided. The computer-readable storage medium may store a computer program, and the computer program is configured to perform the steps in the above method embodiment during running.

According to yet another embodiment of the disclosure, an electronic device is also provided, which may include a memory and a processor. The memory may store a computer program. The processor may be configured to run the computer program to perform the steps in the above method embodiment.

By means of the disclosure, a three-way valve connects a battery heating circuit and an engine cooling circuit together, mixes a first liquid in the engine cooling circuit and a second liquid in the battery heating circuit, transmits a mixed liquid to the battery heating circuit, and heats a battery. The heat exchange between the battery heating circuit and the engine cooling circuit is not required through a heat exchanger. The overall weight and packaging space of a system are reduced, additional components are reduced, and the cost is reduced. The problems of large overall weight and packaging space of a system caused by the use of a heat exchanger and high manufacturing cost in the conventional art are solved.

BRIEF DESCRIPTION OF THE DRAWINGS

The accompanying drawings described herein are used to provide a further understanding of the disclosure, and constitute a part of the present application, and the exemplary embodiments of the disclosure and the description thereof are used to explain the disclosure, but do not constitute improper limitations to the disclosure. In the drawings.

DETAILED DESCRIPTION OF THE EMBODIMENTS

The disclosure is described below with reference to the drawings and in conjunction with the embodiments in detail. It is to be noted that in the case of no conflict, the features in the embodiments and the embodiments in the present application may be combined with each other.

It is to be noted that the specification and claims of the disclosure and the terms "first", "second" and the like in the drawings are used to distinguish similar objects, and do not need to describe a specific sequence or a precedence order.

Figure 3:
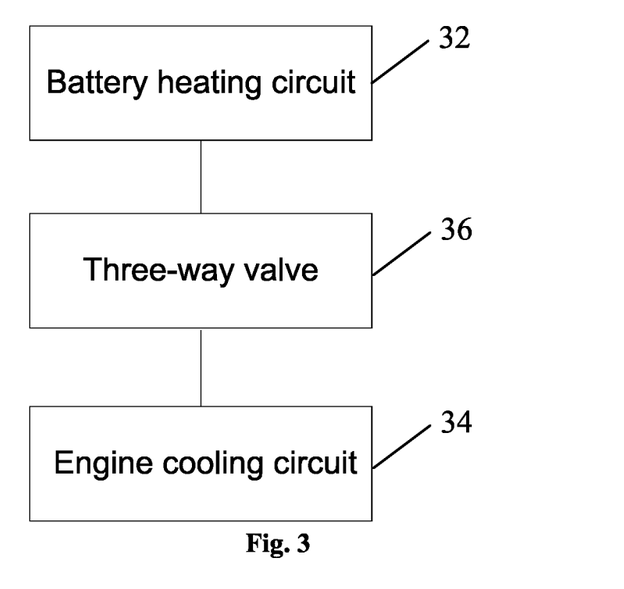
FIG. 3 is a structural block diagram of a battery heating device according to an embodiment of the disclosure.

In the present embodiment, a battery heating device of an electric vehicle is provided. FIG. 3 is a structural block diagram of a battery heating device according to an embodiment of the disclosure. As shown in FIG. 3, the device includes a battery heating circuit 32, an engine cooling circuit 34 and a three-way valve 36. The three-way valve 36 connects the battery heating circuit 32 and the engine cooling circuit 34 to mix a first liquid in the engine cooling circuit 34 and a second liquid in the battery heating circuit 32, and transmits a mixed liquid to the battery heating circuit 32 to heat a battery in the battery heating circuit 32.

In the present embodiment, both the first liquid and the second liquid may be glycerol, ethylene glycol, etc. The disclosure does not limit the first liquid and the second liquid. The first liquid may be the same as the second liquid, and different from the second liquid. The two liquids may be mixed in any ratio without any physical or chemical change after mixing. The mixed liquid may be used as the first liquid to heat the battery or as the second liquid to cool the engine.

By means of the disclosure, a three-way valve connects a battery heating circuit and an engine cooling circuit together, mixes a first liquid in the engine cooling circuit and a second liquid in the battery heating circuit, transmits a mixed liquid to the battery heating circuit, and heats a battery. The heat exchange between the battery heating circuit and the engine cooling circuit is not required through a heat exchanger. The overall weight and packaging space of a system are reduced, additional components are reduced, and the cost is reduced. The problems of large overall weight and packaging space of a system caused by the use of a heat exchanger and high manufacturing cost in the conventional art are solved.

Figure 4:
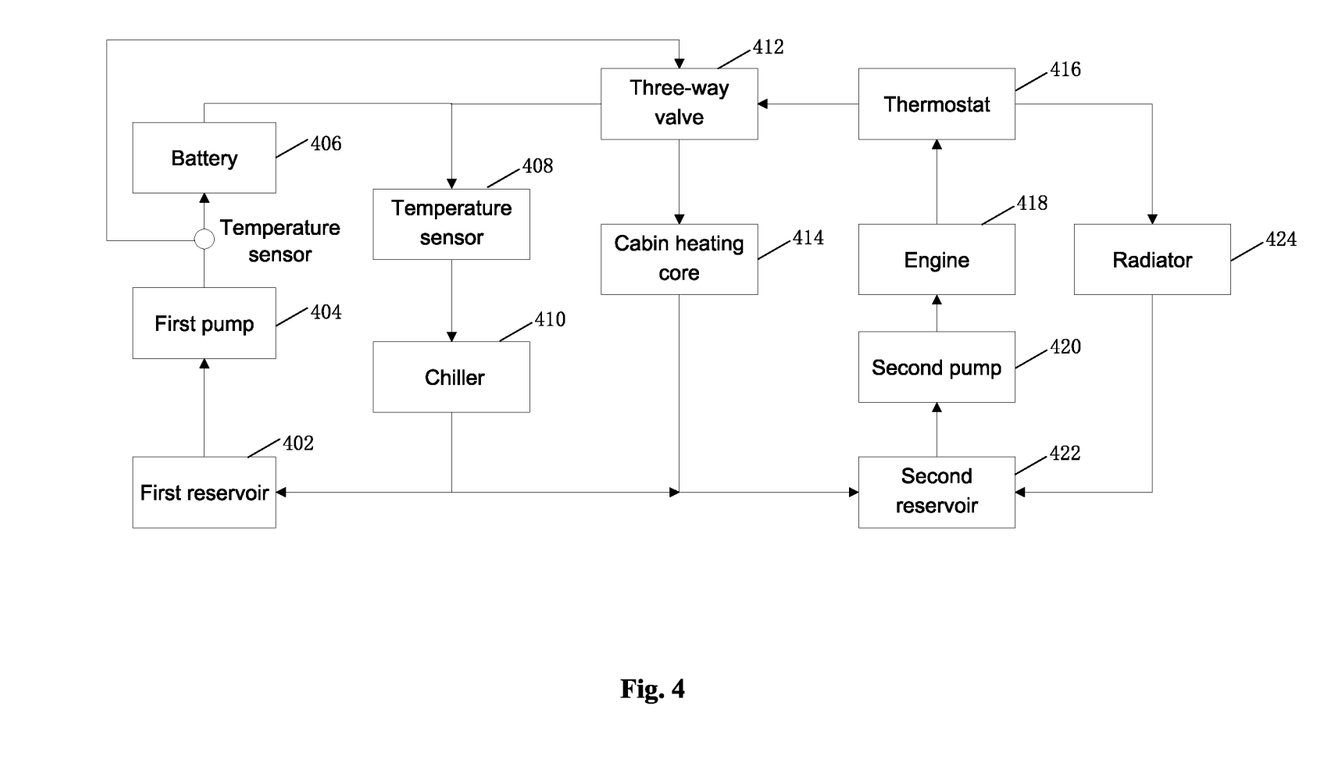
FIG. 4 is a schematic diagram 1 of a battery heating device of an electric vehicle according to an optional embodiment of the disclosure.

In an optional embodiment, the device further includes a temperature sensor, arranged between the battery 406 in the battery heating circuit and a first pump 404 in the battery heating circuit. The temperature sensor is connected to the three-way valve. In the present embodiment, FIG. 4 is a schematic diagram 1 of a battery heating device of an electric vehicle according to an optional embodiment of the disclosure. As shown in FIG. 4, in the battery heating circuit, the first pump 404 and the battery 406 are connected in sequence. The temperature sensor is arranged between the first pump 404 and the battery 406. A three-way valve 412 is connected to the battery heating circuit. The first pump 404 pumps the first liquid, so that the first liquid heats the battery 406. The temperature sensor detects the temperature of the first liquid before the first liquid passes through the battery 406, and the three-way valve adjusts a mixing ratio of the first liquid and the second liquid according to temperature data, so that the temperature of the first liquid passing through the battery 406 is moderate. Therefore, a heat exchanger may be omitted, and when the battery needs to be heated, waste heat can be recycled from the engine.

The mixing ratio of the first liquid and the second liquid may be 1:1 (the value is only an optional embodiment, and the value can be controlled by feedback by using the temperature detected by the temperature sensor. For example, it may be 1:2, 2:1, etc.).

Optionally, a temperature threshold is set in advance. When the temperature detected by the temperature sensor is greater than a temperature threshold, the three-way valve 412 allows less second liquid to be mixed with the first liquid to heat the battery 406. When the temperature detected by the temperature sensor is less than the temperature threshold, the three-way valve 412 allows more second liquid to be mixed with the first liquid to heat the battery. The mixed liquid will travel a long distance and cross multiple components before reaching a battery inlet. Therefore, the temperature of the mixed liquid can be considered to be uniform, and the temperature detected by the temperature sensor represents an average temperature of the liquid in the battery heating circuit. Optionally, the temperature sensor may also be arranged between a first reservoir 402 and the first pump 404 or other positions in the battery heating circuit.

Exemplarily, the device further includes a three-way valve controller. The three-way valve controller is electrically connected to the temperature sensor and the three-way valve 412. The temperature sensor feeds back the detected temperature of the first liquid to the three-way valve controller. The three-way valve controller controls the operation of the three-way valve 412 according to received temperature data, so as to adjust the flow rate of the second liquid flowing from the three-way valve 412 to the battery heating circuit, thereby adjusting the mixing ratio of the first liquid and the second liquid. The three-way valve 412 is a valve capable of operating according to a control instruction sent by the three-way valve controller.

In an optional embodiment, the three-way valve 412 is located between a thermostat 416 in the engine cooling circuit and a cabin heating core 414 in the engine cooling circuit, wherein a first end of the three-way valve 412 is connected to a high voltage heater 408 in the battery heating circuit; a second end of the three-way valve 412 is connected to the cabin heating core 414; a third end of the three-way valve 412 is connected to the thermostat 416; and a chiller 410 in the battery heating circuit is connected to a second reservoir 422 in the engine cooling circuit. In the present embodiment, as shown in FIG. 4, in the battery heating circuit, the high voltage heater 408, the chiller 410, the first reservoir 402, the first pump 404, and the battery 406 are connected in sequence, the temperature sensor is arranged between the first pump 404 and the battery 406, and the three-way valve 412 is connected to the high voltage heater 408. In the engine cooling circuit, an engine 418 and the thermostat 416 are also connected to a radiator 424 in sequence. The thermostat 416 may automatically adjust the flow into the three-way valve 412 and the radiator 424 according to the temperature of the second liquid, so as to ensure that the engine operates in a proper temperature range. The second liquid flows in a core of the radiator 424, air passes outside the radiator, and the second liquid reduces the temperature by emitting heat to the air, thereby cooling the engine.

In the present embodiment, when the temperature detected by the temperature sensor is lower than the temperature threshold and the heat generated by the engine 418 is sufficient to heat the battery to a predetermined temperature, the thermostat 416 lets more second liquid pass through the three-way valve 412 and less second liquid pass through the radiator 424. The mixing ratio of the first liquid and the second liquid is controlled by the three-way valve 412 so as to heat the battery 406 by using the heat generated by the engine 418. The device further includes a thermostat controller. The thermostat controller is electrically connected to the thermostat 416. The thermostat controls the flow of the second liquid passing through the three-way valve through a signal sent by the thermostat controller. When the heat generated by the engine is insufficient to provide energy to heat the battery 406 to a predetermined temperature, the thermostat 416 prohibits the second liquid from passing through the radiator 424, and the high voltage heater 408 converts electric energy stored in the battery 406 into a heat load and heats the battery 406. The high voltage heater 408 may include a resistance wire. The resistance wire is wound around a pipe containing the first liquid and is connected to the battery 406. When current passes through the resistance wire, heat is generated to raise the temperature of the first liquid and heat the battery 406. When the temperature of the battery 406 is too high, the three-way valve 412 prohibits the second liquid from being mixed with the first liquid, and the chiller 410 operates to cool the battery 406 by reducing the temperature of the first liquid. The chiller may include an evaporator to cool the battery 406 by reducing the temperature of the first liquid.

Figure 5:
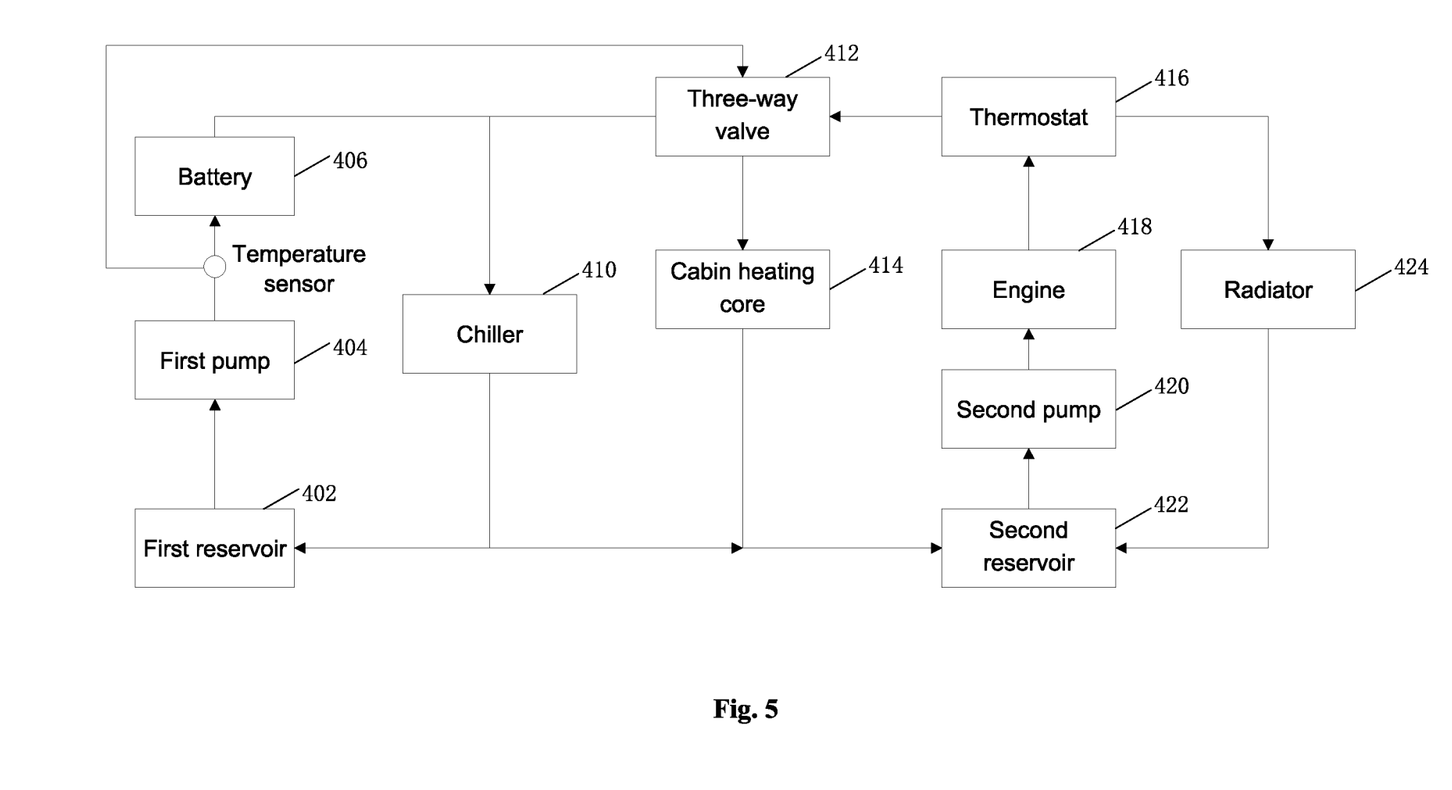
FIG. 5 is a schematic diagram 2 of a battery heating device of an electric vehicle according to an optional embodiment of the disclosure.

In an optional embodiment, the three-way valve is located between a thermostat 416 in the engine cooling circuit and a cabin heating core 414 in the engine cooling circuit. The battery heating circuit includes a chiller 410, a first reservoir 402, a first pump 404, and the battery 406 connected in sequence, a first end of the three-way valve 412 is connected to the chiller 410; a second end of the three-way valve 412 is connected to the cabin heating core 414; a third end of the three-way valve 412 is connected to the thermostat 416; and the chiller 410 in the battery heating circuit is connected to a second reservoir 422 in the engine cooling circuit. In the present embodiment, FIG. 5 is a schematic diagram 2 of a battery heating device of an electric vehicle according to an optional embodiment of the disclosure. As shown in FIG. 5, in the battery heating circuit, the chiller 410, the first reservoir 402, the first pump 404 and the battery 406 are connected in sequence. The temperature sensor is arranged between the first pump 404 and the battery 406. The three-way valve 412 is connected to the chiller 410. In the engine cooling circuit, the second reservoir 422, the second pump 420, the engine 418, the thermostat 416, and the radiator 424 are connected in sequence. The thermostat 416, the three-way valve 412, the cabin heating core 414 and the second reservoir 422 are connected in sequence. In general, the heat generated by the engine 418 is sufficient to heat the battery to a predetermined temperature, so the high voltage heater 408 can be omitted, and the three-way valve 412 is directly connected to the chiller 410. When the temperature detected by the temperature sensor is greater than a temperature threshold, the three-way valve 412 allows less second liquid to be mixed with the first liquid to heat the battery. When the temperature detected by the temperature sensor is less than the temperature threshold, the three-way valve 412 allows more second liquid to be mixed with the first liquid to heat the battery. The high voltage heater 408 is eliminated, so as to the cost is reduced, the packaging space is reduced, and the system complexity is reduced.

Figure 6:
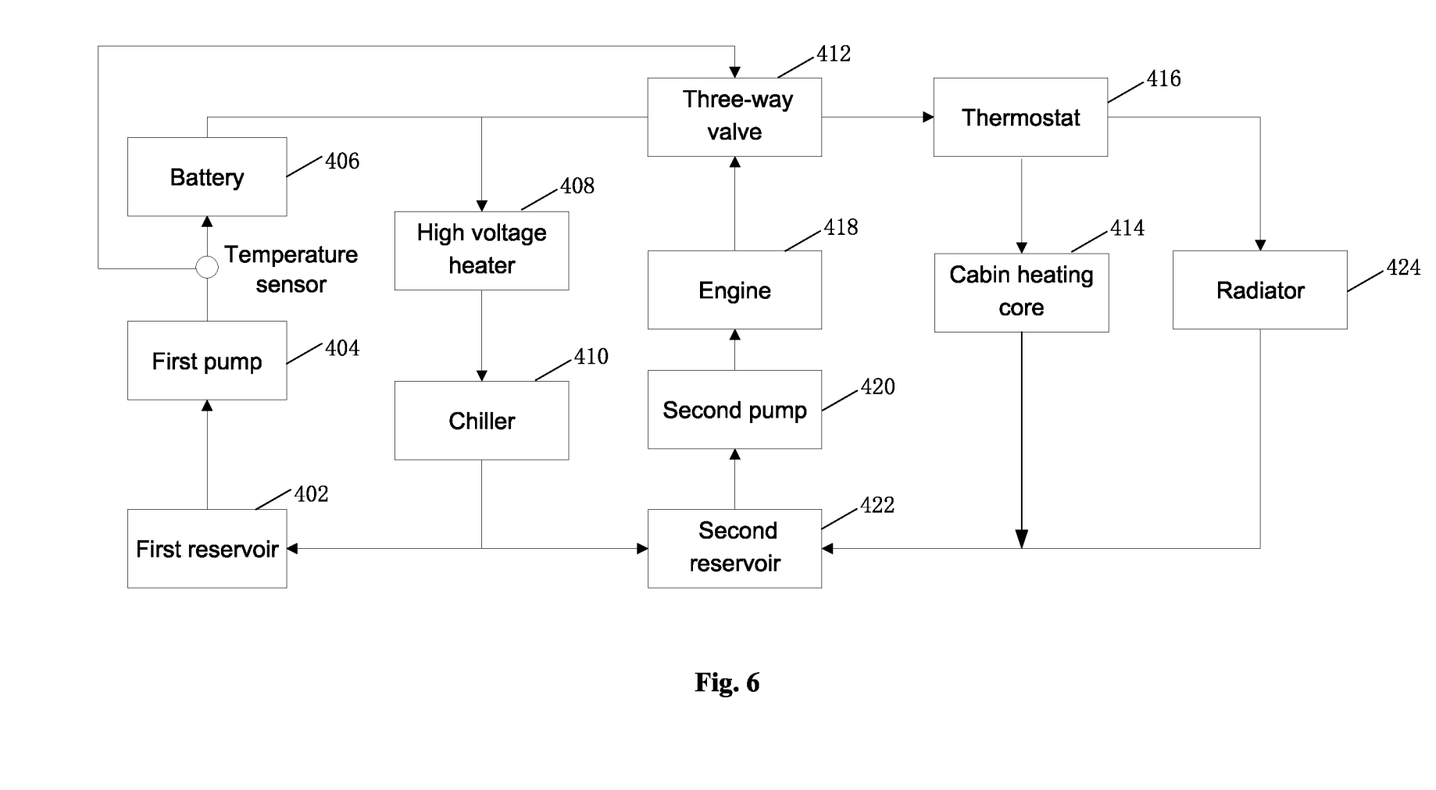
FIG. 6 is a schematic diagram 3 of a battery heating device of an electric vehicle according to an optional embodiment of the disclosure.

In an optional embodiment, the three-way valve 412 is located between a thermostat 416 in the engine cooling circuit and an engine 418 in the engine cooling circuit, a first end of the three-way valve 412 is connected to a high voltage heater 408 in the battery heating circuit; a second end of the three-way valve 412 is connected to the engine 418; a third end of the three-way valve 412 is connected to the thermostat 416; and a chiller 410 in the battery heating circuit is connected to a second reservoir 422 in the engine cooling circuit. In the present embodiment, FIG. 6 is a schematic diagram 3 of a battery heating device of an electric vehicle according to an optional embodiment of the disclosure. As shown in FIG. 6, in the battery heating circuit, the high voltage heater 408, the chiller 410, the first reservoir 402, the first pump 404 and the battery 406 are connected in sequence. The temperature sensor is arranged between the first pump 404 and the battery 406. A three-way valve 412 is connected to the high voltage heater 408. In the engine cooling circuit, the three-way valve 412, the thermostat 416, the cabin heating core 414, the second reservoir 422, the second pump 420, and the engine 418 are connected in sequence, and the thermostat 416, the cabin heating core 414 and the radiator 424 are connected in sequence. The three-way valve 412 is directly introduced into the engine cooling circuit. The three-way valve 412 is directly connected to the engine 418, so that heat generated by the engine 418 passes directly through the three-way valve without the control of the thermostat 416. When the temperature detected by the temperature sensor is lower than a temperature threshold and the heat generated by the engine 418 is sufficient to heat the battery to a predetermined temperature, the three-way valve 412 allows more second liquid to be mixed with the first liquid to heat the battery 406 to a predetermined temperature, and the three-way valve 412 allows less second liquid to pass through the thermostat 416. When the temperature detected by the temperature sensor is higher than the temperature threshold, the three-way valve 412 prohibits the second liquid from being mixed with the first liquid and the second liquid from passing through the thermostat 416. Compared with the three-way valve 412 arranged at an inlet of the cabin heating core 414, the three-way valve 412 is arranged at an engine water jacket outlet, but a coupling mechanism between the three-way valve controller and the thermostat controller is different.

Figure 7:
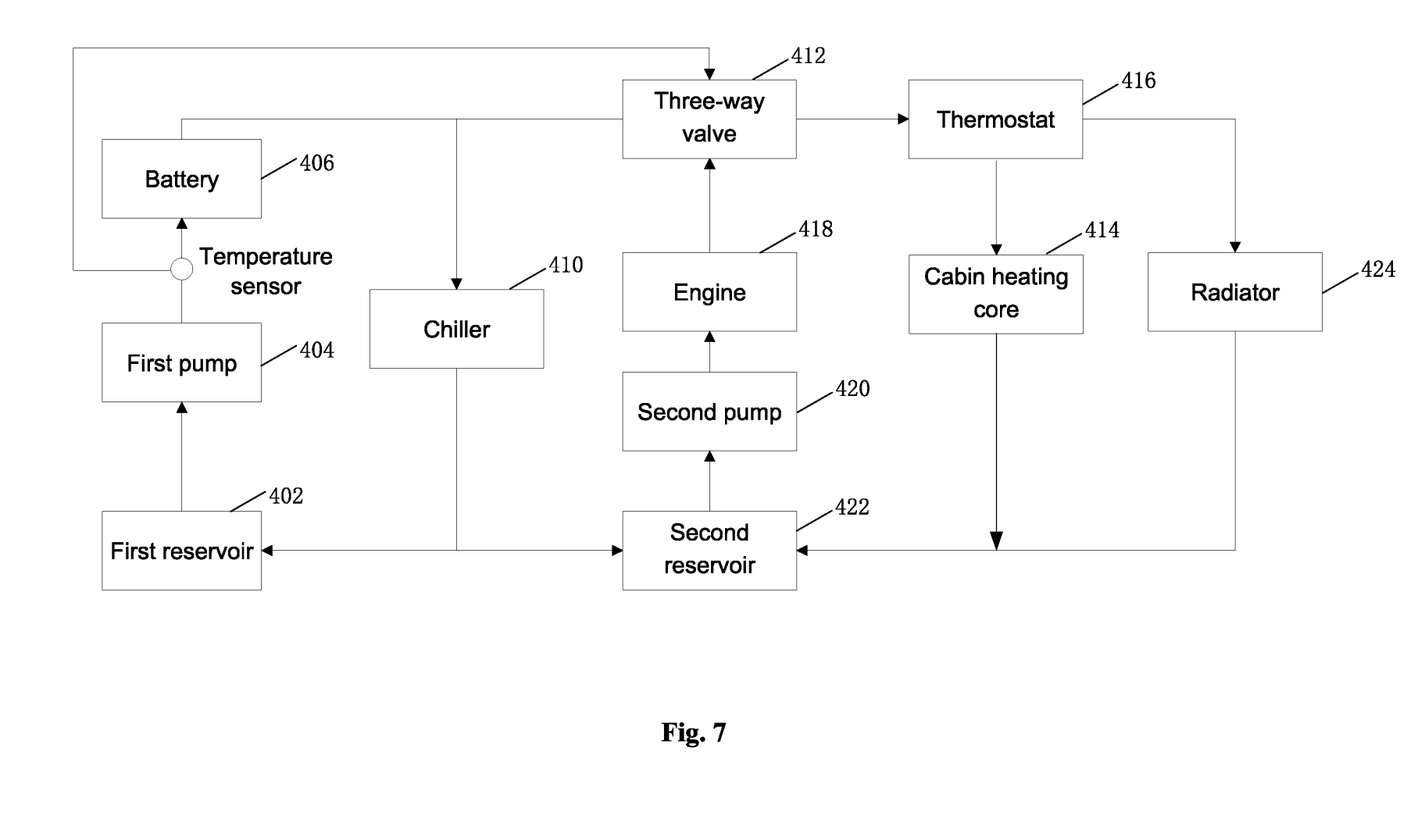
FIG. 7 is a schematic diagram 4 of a battery heating device of an electric vehicle according to an optional embodiment of the disclosure.

In an optional embodiment, the three-way valve is located between a thermostat 416 in the engine cooling circuit and an engine 418 in the engine cooling circuit. The battery heating circuit includes a chiller 410, a first reservoir 402, a first pump 404, and the battery 406 connected in sequence, a first end of the three-way valve 412 is connected to the chiller 410; a second end of the three-way valve 412 is connected to the engine 418; a third end of the three-way valve 412 is connected to the thermostat 416; and the chiller 410 in the battery heating circuit is connected to a second reservoir 422 in the engine cooling circuit. In the present embodiment, FIG. 7 is a schematic diagram 4 of a battery heating device of an electric vehicle according to an optional embodiment of the disclosure. As shown in FIG. 7, in the battery heating circuit, the chiller 410, the first reservoir 402, the first pump 404 and the battery 406 are connected in sequence. The temperature sensor is arranged between the first pump 404 and the battery 406. A three-way valve 412 is connected to the chiller 410. In general, the heat generated by the engine 418 is sufficient to heat the battery to a predetermined temperature, so the high voltage heater 408 can be omitted, and the three-way valve 412 is directly connected to the chiller 410. When the temperature detected by the temperature sensor is greater than a temperature threshold, the three-way valve 412 allows less second liquid to be mixed with the first liquid to heat the battery. When the temperature detected by the temperature sensor is less than the temperature threshold, the three-way valve 412 allows more second liquid to be mixed with the first liquid to heat the battery. The high voltage heater 408 is eliminated, the cost is reduced, the packaging space is reduced, and the system complexity is reduced.

In the foregoing embodiment, the battery is heated using the accurately metered waste heat recycled from the engine cooling circuit, which improves the energy use efficiency and the equivalent fuel economy, reduces the cost, and reduces the weight and packaging space of the system to make the system more compact and lighter.

Figure 8:
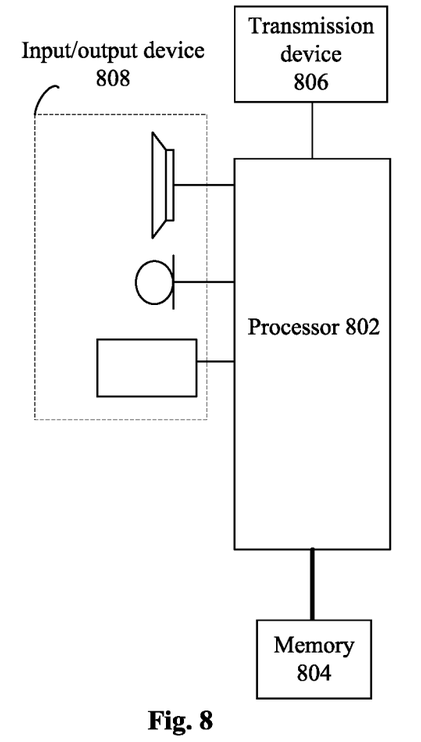
FIG. 8 is a block diagram of a hardware structure of a mobile terminal for a battery heat adjustment method according to an embodiment of the disclosure.

The embodiment of the application also provides a battery heat adjustment method. The method embodiment provided in the embodiments of the application may be implemented in a mobile terminal, a computer terminal or a similar computing device. Running on a mobile terminal is taken as an example. FIG. 8 is a block diagram of a hardware structure of a mobile terminal for a battery heat adjustment method according to an embodiment of the disclosure. As shown in FIG. 8, the mobile terminal 80 may include one or more (only one is shown in FIG. 8) processors 802 (the processor 802 may include but is not limited to a processing apparatus such as a Micro Controller Unit (MCU) or a Field Programmable Gate Array (FPGA)) and a memory 804 for storing data. Optionally, the above mobile terminal may further include a transmission device 806 and an input/output device 808 for communication functions. Those skilled in the art can understand that the structure shown in FIG. 8 is merely illustrative, and does not limit the structure of the above mobile terminal. For example, the mobile terminal 80 may also include more or fewer components than shown in FIG. 8, or has a different configuration from that shown in FIG. 8.

The memory 804 may be configured to store a computer program, for example, a software program and module of application software, such as a computer program corresponding to the battery heat adjustment method in the embodiment of the disclosure, and the processor 802 executes various functional applications and data processing by running the computer program stored in the memory 804, that is, implements the above method. The memory 804 may include a high speed random access memory and may also include a non-volatile memory such as one or more magnetic storage devices, a flash memory, or other non-volatile solid state memories. In some examples, the memory 804 may further include memories remotely located relative to the processor 802, which may be connected to the mobile terminal 80 over a network. The examples of such networks include, but are not limited to, the Internet, the Intranet, local area networks, mobile communication networks, and combinations thereof.

The transmission device 806 is configured to receive or send data via a network. The above specific network example may include a wireless network provided by a communication provider of the mobile terminal 80. In one example, the transmission device 806 includes a Network Interface Controller (NIC) that may be connected to other network devices through a base station to communicate with the Internet. In one example, the transmission device 806 may be a Radio Frequency (RF) module for communicating with the Internet wirelessly.

Figure 9:
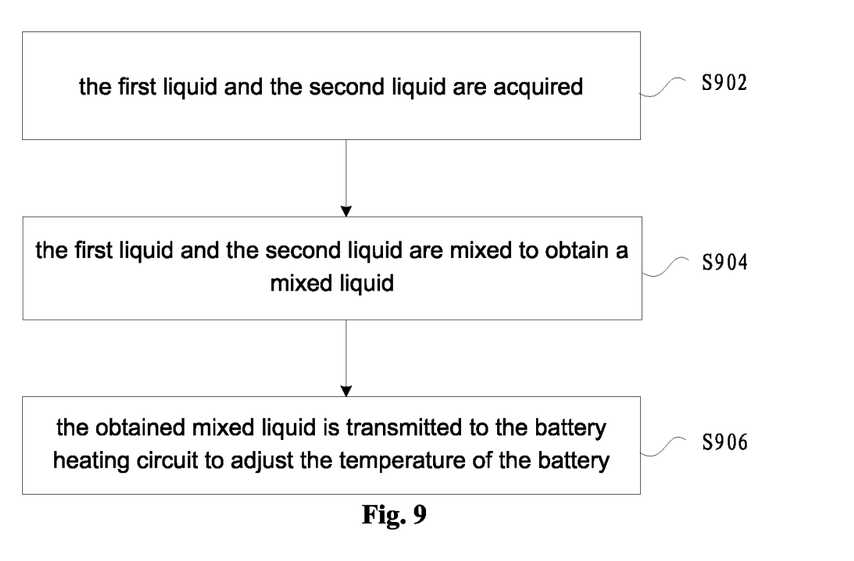
FIG. 9 is a flowchart of a battery heat adjustment method according to an embodiment of the disclosure.

In the present embodiment, a battery heat adjustment method applicable to the foregoing battery heating device of an electric vehicle is provided. FIG. 9 is a flowchart of a battery heat adjustment method according to an embodiment of the disclosure. As shown in FIG. 9, the flow includes the following steps.

In step S902, the first liquid and the second liquid are acquired.

In step S904, the first liquid and the second liquid are mixed to obtain a mixed liquid.

In step S906, the obtained mixed liquid is transmitted to the battery heating circuit to adjust temperature of the battery.

In an optional embodiment, the method further includes that: the temperature of the first liquid flowing to the battery in the battery heating circuit is acquired; a mixing ratio of the first liquid and the second liquid is adjusted based on the temperature of the first liquid to obtain a mixed liquid reaching a target temperature; and the mixed liquid reaching the target temperature is transmitted to the battery heating circuit to adjust the temperature of the battery.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the disclosure, which is essential or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a computer, a server, or a network device, etc.) to perform the methods described in various embodiments of the disclosure.

The embodiment of the disclosure also provides a computer-readable storage medium. The computer-readable storage medium stores a computer program, and the computer program is configured to perform the steps in any one of the above method embodiments during running.

Optionally, in the present embodiment, the computer-readable storage medium may be configured to store the computer program for performing the following steps.

In S1, the first liquid and the second liquid are acquired.

In S2, the first liquid and the second liquid are mixed to obtain a mixed liquid.

In S3, the obtained mixed liquid is transmitted to the battery heating circuit to adjust the temperature of the battery.

Optionally, the computer-readable storage medium is further configured to store the computer program for performing the following steps.

In S1, temperature of the first liquid flowing to the battery in the battery heating circuit is acquired.

In S2, a mixing ratio of the first liquid and the second liquid is adjusted based on the temperature of the first liquid to obtain a mixed liquid reaching a target temperature.

In S3, the mixed liquid reaching the target temperature is transmitted to the battery heating circuit to adjust the temperature of the battery.

Optionally, in the present embodiment, the computer-readable storage medium may include, but is not limited to, various media capable of storing a computer program such as a U disk, a ROM, a RAM, a mobile hard disk, a magnetic disk or an optical disc.

The embodiment of the disclosure also provides an electronic device, which includes a memory and a processor. The memory stores a computer program. The processor is configured to run the computer program to perform the steps in any one of the above method embodiments.

Optionally, the electronic device may further include a transmission device and an input/output device, and the transmission device is connected to the processor, and the input/output device is connected to the processor.

Optionally, in the present embodiment, the processor may be configured to perform the following steps through the computer program.

In S1, the first liquid and the second liquid are acquired.

In S2, the first liquid and the second liquid are mixed to obtain a mixed liquid.

In S3, the obtained mixed liquid is transmitted to the battery heating circuit to adjust the temperature of the battery.

Optionally, the processor may be configured to perform the following steps through the computer program.

In S1, temperature of the first liquid flowing to the battery in the battery heating circuit is acquired.

In S2, a mixing ratio of the first liquid and the second liquid is adjusted based on the temperature of the first liquid to obtain a mixed liquid reaching a target temperature.

In S3, the mixed liquid reaching the target temperature is transmitted to the battery heating circuit to adjust the temperature of the battery.

Optionally, a specific example in the present embodiment may refer to the examples described in the above embodiments and optional implementation manners, and details are not described herein in the present embodiment.

Obviously, those skilled in the art should understand that the above-mentioned steps of the disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple steps therein are made into a single integrated circuit module for implementation. As such, the disclosure is not limited to any particular combination of hardware and software.

The above is only the preferred embodiments of the disclosure, not intended to limit the disclosure. As will occur to those skilled in the art, the disclosure is susceptible to various modifications and changes. Any modifications, equivalent replacements, improvements and the like made within the principle of the disclosure shall fall within the scope of protection of the disclosure.

What is claimed is:

1. A battery heating device of an electric vehicle, comprising:
   a battery heating circuit, an engine cooling circuit, a three-way valve, and a temperature sensor, wherein the three-way valve connects the battery heating circuit and the engine cooling circuit to mix a first liquid in the engine cooling circuit and a second liquid in the battery heating circuit, and transmits a mixed liquid to the battery heating circuit to heat a battery in the battery heating circuit, the temperature sensor is arranged between the battery in the battery heating circuit and a first pump in the battery heating circuit, and connected to the three-way valve, the temperature sensor detects a temperature of the first liquid before the first liquid passes through the battery, the three-way valve is configured to adjust adjusts a mixing ratio of the first liquid and the second liquid according to temperature data;
   the three-way valve is located between a thermostat in the engine cooling circuit and a cabin heater core in the engine cooling circuit, wherein
   a first end of the three-way valve is connected to a high voltage heater in the battery heating circuit;
   a second end of the three-way valve is connected to the cabin heater core;
   a third end of the three-way valve is connected to the thermostat; and
   a chiller in the battery heating circuit is connected to a second reservoir in the engine cooling circuit.

2. The device as claimed in claim 1, wherein the three-way valve is located between a thermostat in the engine cooling circuit and a cabin heating core in the engine cooling circuit, and the battery heating circuit comprises a chiller, a first reservoir, a first pump and the battery connected in sequence, wherein
   a first end of the three-way valve is connected to the chiller;
   a second end of the three-way valve is connected to the cabin heating core;
   a third end of the three-way valve is connected to the thermostat; and
   the chiller in the battery heating circuit is connected to a second reservoir in the engine cooling circuit.

3. The device as claimed in claim 1, wherein the three-way valve is located between a thermostat in the engine cooling circuit and an engine in the engine cooling circuit, wherein
   a first end of the three-way valve is connected to a high voltage heater in the battery heating circuit;
   a second end of the three-way valve is connected to the engine;
   a third end of the three-way valve is connected to the thermostat; and
   a chiller in the battery heating circuit is connected to a second reservoir in the engine cooling circuit.

4. The device as claimed in claim 1, wherein the three-way valve is located between a thermostat in the engine cooling circuit and an engine in the engine cooling circuit, and the battery heating circuit comprises a chiller, a first reservoir, a first pump and the battery connected in sequence, wherein
   a first end of the three-way valve is connected to the chiller;
   a second end of the three-way valve is connected to the engine;
   a third end of the three-way valve is connected to the thermostat; and
   the chiller in the battery heating circuit is connected to a second reservoir in the engine cooling circuit.

5. A battery heat adjustment method, applied to the device as claimed in claim 1, wherein
   acquiring the first liquid and the second liquid;
   mixing the first liquid and the second liquid to obtain a mixed liquid; and
   transmitting the obtained mixed liquid to the battery heating circuit to adjust temperature of the battery.

6. A battery heat adjustment method, applied to the device as claimed in claim 1, wherein
   acquiring the first liquid and the second liquid;
   mixing the first liquid and the second liquid to obtain a mixed liquid; and transmitting the obtained mixed liquid to the battery heating circuit to adjust temperature of the battery.

7. A battery heat adjustment method, applied to the device as claimed in claim 2, wherein
acquiring the first liquid and the second liquid;
mixing the first liquid and the second liquid to obtain a mixed liquid; and
transmitting the obtained mixed liquid to the battery heating circuit to adjust temperature of the battery.

8. A battery heat adjustment method, applied to the device as claimed in claim 3, wherein
acquiring the first liquid and the second liquid;
mixing the first liquid and the second liquid to obtain a mixed liquid; and
transmitting the obtained mixed liquid to the battery heating circuit to adjust temperature of the battery.

9. A battery heat adjustment method, applied to the device as claimed in claim 4, wherein
acquiring the first liquid and the second liquid;
mixing the first liquid and the second liquid to obtain a mixed liquid; and
transmitting the obtained mixed liquid to the battery heating circuit to adjust temperature of the battery.

10. The method as claimed in claim 5, further comprising:
acquiring temperature of the first liquid flowing to the battery in the battery heating circuit;
adjusting a mixing ratio of the first liquid and the second liquid based on the temperature of the first liquid to obtain a mixed liquid reaching a target temperature; and
transmitting the mixed liquid reaching the target temperature to the battery heating circuit to adjust the temperature of the battery.

11. The method as claimed in claim 6, further comprising:
acquiring temperature of the first liquid flowing to the battery in the battery heating circuit;
adjusting a mixing ratio of the first liquid and the second liquid based on the temperature of the first liquid to obtain a mixed liquid reaching a target temperature; and
transmitting the mixed liquid reaching the target temperature to the battery heating circuit to adjust the temperature of the battery.

12. The method as claimed in claim 7, further comprising:
acquiring temperature of the first liquid flowing to the battery in the battery heating circuit;
adjusting a mixing ratio of the first liquid and the second liquid based on the temperature of the first liquid to obtain a mixed liquid reaching a target temperature; and
transmitting the mixed liquid reaching the target temperature to the battery heating circuit to adjust the temperature of the battery.

13. The method as claimed in claim 8, further comprising:
acquiring temperature of the first liquid flowing to the battery in the battery heating circuit;
adjusting a mixing ratio of the first liquid and the second liquid based on the temperature of the first liquid to obtain a mixed liquid reaching a target temperature; and
transmitting the mixed liquid reaching the target temperature to the battery heating circuit to adjust the temperature of the battery.

14. The method as claimed in claim 9, further comprising:
acquiring temperature of the first liquid flowing to the battery in the battery heating circuit;
adjusting a mixing ratio of the first liquid and the second liquid based on the temperature of the first liquid to obtain a mixed liquid reaching a target temperature; and
transmitting the mixed liquid reaching the target temperature to the battery heating circuit to adjust the temperature of the battery.

15. A computer-readable storage medium, storing a computer program, wherein the computer program is configured to perform the method as claimed in claim 5 during running.

16. An electronic device, comprising a memory and a processor, wherein the memory stores a computer program, and the processor is configured to run the computer program to perform the method as claimed in claim 5.

* * * * *